Patented June 26, 1951

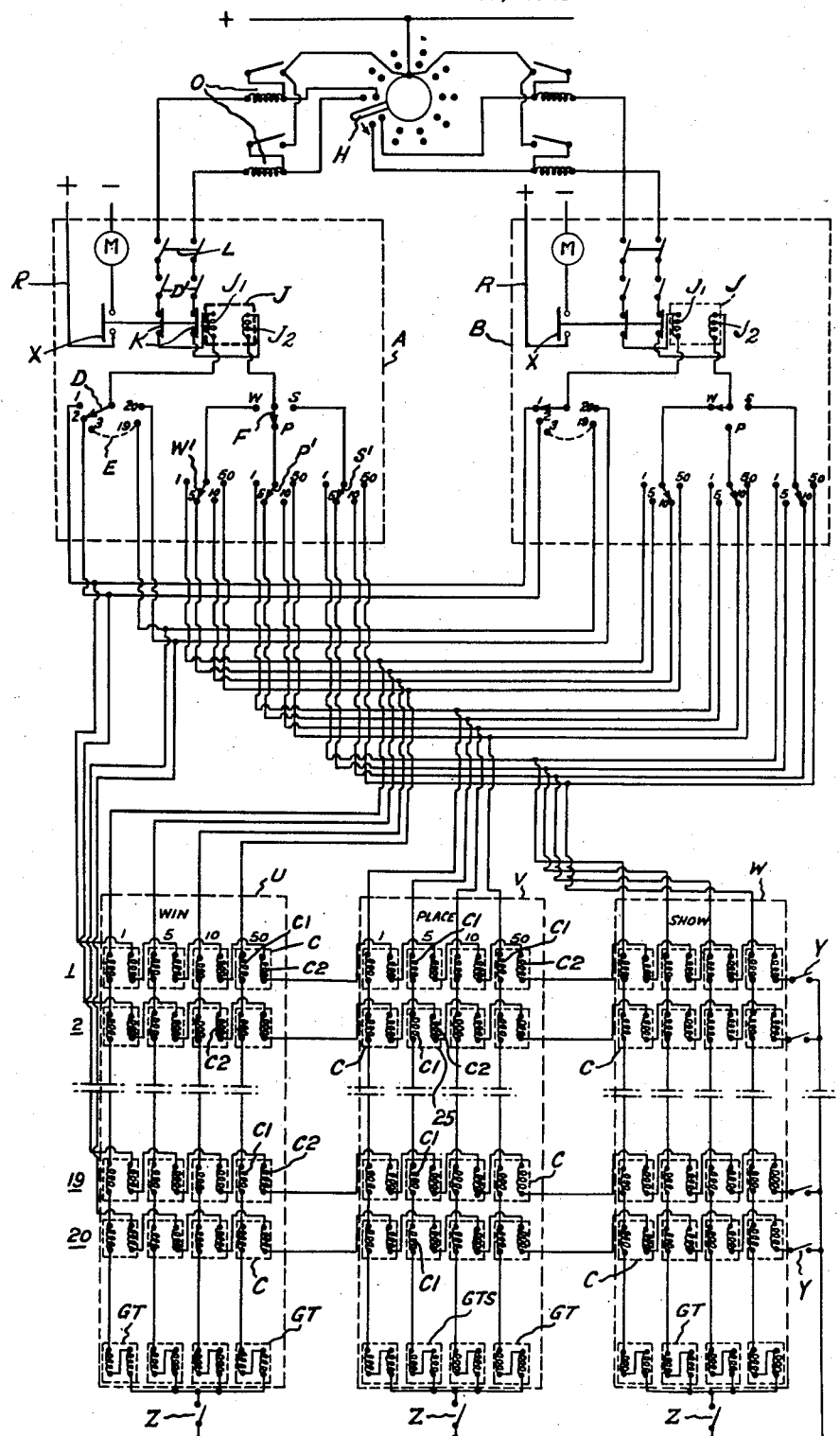

2,558,218

UNITED STATES PATENT OFFICE 2,558,218

MULTISTAKE TOTALIZATOR ARRANGEMENT

Awdry Francis Julius, Sydney, New South Wales, Australia, assignor to Automatic Totalisators Limited, Meadowbank, near Sydney, New South Wales, Australia, a company of New South Wales, Australia Application November 23, 1948, Serial No. 61,636
In Australia December 17, 1947

3 Claims. (Cl. 235—92)

The object of this invention is to provide simple means whereby a totalisator installation may be employed for issuing tickets in respect of the competitors in a particular event for any one of two or more values, and in respect of any one of two or more pools. That is to say (for example), whereby tickets may be sold on any competitor for "win," "place" or "show" pools with a selected ticket value of say one monetary unit, 5 units, 10 units or 50 units.

In the past it has been common practice to provide totalisators with means for selling tickets of uniform cost on two different pools; for example, tickets could be sold on any one selected competitor to "win" or gain a "place" for one single monetary unit such as five shillings.

In the prior installations, the adding equipment for recording the transactions, consists of a grand total adding unit for each pool and a set of competitor adding units corresponding to the number of competitors for each pool, for instance, if there were three pools and twenty competitors, the total number of adding units would be 63 (being 60 competitor adding units, and a grand total adding unit for each of the three pools).

Selection of the required pool was usually effected by manipulation of the selector switch handpiece whereby the competitor (upon which the ticket was required) was selected, and this manipulation sufficed to connect the ticket issuer to the "win" or the "place" adding units, as the case may be.

With the prior arrangement referred to (selling tickets of one value only) it was necessary to provide a set of "competitor" wires for each pool, and a common wire for each pool; that is, if there were twenty competitors and two pools, the number of wires would be 42. Each individual ticket issuing machine would sell one value of ticket only, and every issuing machine selling tickets of different value would be connected to different magnets for operating the escapements in the adding units.

The above described installation could be extended to provide for the issue of tickets of different values; but, for each additional value the number of connecting wires would have to be doubled. For example, to provide for four ticket values in two pools on twenty competitors, the number of wires required would be four times forty-two; that is, one hundred and sixty-eight. For the same arrangement but with one more pool the number of wires would have to be increased by 50% i. e., to two hundred and fifty-two. It follows, that where a ticket issuer is required to sell tickets on two or more pools for two or more ticket values the number of wires and connections becomes excessive to the point of impracticability.

Hence, the object of this invention may be restated as the provision of a totalisator installation which although of the known general class referred to herein, changes what would be an impracticable installation for multi-stake, multi-pool purposes, into a relatively simple and highly practicable one when applied to those purposes.

The invention may be summarised as consisting in a race totalisator of the kind comprising means for issuing tickets, a plurality of electromagnetically operable competitor adding units, and a plurality of electromagnetically operable grand total adding units; which incorporates three selector switches (namely, a "competitor" switch, a "pool" switch, and a "stake" switch) operating magnets for the competitor adding units (herein called "C" magnets) which each consist of two combinedly effective but individually ineffective parts, operating magnets for the grand total adding units (herein called "GT" magnets) and conductor means whereby upon circuit closure through the three selector switches only one of the GT magnets is energised and only one of the C magnets has both of its parts energised.

An example of the invention is illustrated diagrammatically in the single figure of the drawings herewith. The illustrated example indicates two ticket issuing machines by dotted enclosures A and B. There may be only one such machine in an installation or there may be more than two. If there are more than one they are identical, and for convenience of description the installation is largely described herein in terms of a single issuer.

In the illustrated arrangement the ticket issuing machine A has a competitor or first selector switch D having a series E (say twenty) of first selector contacts (1, 2, 3 ... 19, 20) associated therewith, a pool or second selector switch F having three second selector contacts W, P and S associated therewith, and three stake or third selector switches $W^1$, $P^1$ and $S^1$ respectively connected to contacts W, P and S and each having a series of third selector contacts (marked 1, 5, 10 and 50) associated therewith. The switches D and F are respectively connected to a pair of contacts in a common rotary distributor switch, indicated at H, through a trip magnet J, and trip switches K. This portion of the circuit preferably includes a control switch L whereby the particular issuer A may be placed in or out of action as may be required, and a pair of holding relay switches O. These switches O are of the common type usually employed in such circuits to ensure the adding circuits remaining closed long enough to be effective notwithstanding that the contact arm of the distributor switch H may have left the related distributor contacts. The trip magnet J consists of two combinedly effective but individually ineffective parts J1 and J2. When both of these parts are energised at the same time they are able to open the trip switches K but not otherwise.

The issuer circuit is indicated at R. It is of the known kind which includes a motor M, which on being started (by closure of the issuer switch X) provides the power for the mechanical printing and production of an appropriate ticket and also the operation of cam devices for reverting the switch X and the trip switch K to the positions shown in the drawing. It will be appreciated that in its manner of operation the trip switch is of known kind. The two trip switch parts K are normally closed and although electrically effective only in their respective circuits are concertedly operable mechanically as a single entity. When only one of the trip magnet parts J1 or J2 is energised the trip switch is not affected, but when both parts J1 and J2 are energized the trip magnet parts together move to open circuit position, and by that action close the issuer switch X.

The selector switch D is of the known kind operable by a handpiece which on being depressed will close the usual handpiece switches D1. All of the selector switches (D, F, W$^1$, P$^1$ and S$^1$) or the handpieces thereof are of the known kind which on being swung towards the selected selector contacts, turn or otherwise move type wheels or blocks for respectively printing the competitor number, the class of pool and the stake amount on the ticket to be issued relative to the particular transaction. The several selector switches or the handpieces therefor are also of the known kind provided with locking devices which, once a transaction recording has been initiated, prevent their re-operation until such time as that transaction has been recorded and a ticket therefor has actually been printed and issued.

The C magnets (represented by dotted squares marked C) each consist of two combinedly effective but individually ineffective first and second parts C1 and C2 respectively. When the two parts C1 and C2 are both energised at the same time they are able to operate an ordinary escapement in a competitor adding unit in known manner as if they constituted a single magnet as used heretofore; but they are arranged, and the escapement lever loading spring associated therewith is of such strength that when either magnet part is energised by itself it is unable to influence actuation of the related escapement lever.

The GT magnets (represented by dotted squares marked GT) may each consist of a single magnet, but for the sake of uniformity of magnet construction throughout the installation they preferably each consist of two magnets connected in series as shown.

The several magnets may be regarded as divisible into three pool groups. These groups are "Win," "Place" and "Show" groups as indicated by dotted enclosures U, V and X. The vertical rows or files of magnets in any of the groups are "stake" files which correspond with stake values provided for by the third selector contacts (i. e., 1, 5, 10 and 50 monetary units). The stake files each consist of a number of C magnets and one GT magnet. The horizontal rows or ranks of magnets throughout the pool groups are competitor ranks. The number of ranks corresponds to the number of first selector contacts (i. e., 1, 2 ... 19, 20).

The ranks (of four magnets) in each group operate escapements feeding into a single adding unit; for example, the top rank in group U feeds into a "win" adding unit for competitor No. 1, and the bottom rank in group U feeds into a "Win" grand total adding unit for all the competitors.

The operating magnets are connected to the first and third selector contacts so that upon circuit closure through the selector switches only one of the GT magnets is energised and only one of the C magnets has both its parts energised. The connections for this purpose are as shown in the drawings. Competitor selector contact No. 1 (in series E) is serially connected to all the C magnet second parts (C2) in the No. 1 rank for all three pool groups. Competitor selector contact No. 2 is similarly connected relative to the No. 2 rank, and so on for all the ranks. The No. 1 stake selector contact (associated with the stake selector switch W$^1$ and the "win" pool selector contact W) is serially connected to all the C magnet first parts (C1) and the GT magnet in the single-unit stake file within the win group U. The No. 5 stake selector contact (associated with the win contact W) is similarly connected relative to the five-unit stake file within the win group U; and so on for all the magnet files.

Each rank of C magnets preferably ends in a "scratching" switch Y which is normally closed but which may be opened so that no transactions will be recorded on a competitor number not in use, for example when that particular competitor has been "scratched" from the event.

Each group of magnets (U, V and W) preferably ends in a pool main switch Z which is normally closed but may be opened so that transaction recording in any one pool may be halted, when required, without halting recording of transactions in the other pools.

For preference the third selector switches W$^1$, P$^1$ and S$^1$ are linked together for ganged operation by way of a single handpiece furnished with known locking means to hold it in the selected position until the transaction for that position has been recorded and a ticket issued thereon.

As previously indicated herein, the above described operating and circuiting arrangements are applicable to an installation having only one ticket issuer (such as A) or to an installation having any required greater number of issuers. B indicates a second issuer. The circuit connections for this second issuer will be apparent from the drawings, and this applies equally for further issuers which may be present. Where only one ticket issuer is employed a distributor switch such as H and holding relays such as O are not required, but when more than one issuer is present the distributor is necessary so that only one issuer may be effective at any one time, so to avoid confusion of transaction recordings.

Assuming that a five monetary units ticket is required for a "place" transaction on competitor No. 2, and that issuer A is to be used; the several selector switches (D, F and P$^1$) are first positioned (as shown) to correspond with the required transaction. The handpiece for the first selector switch D is then depressed. This locks the three handpieces against further movement, for the time being, and also closes the handpiece switches $D^1$. If there is only one ticket issuer present (and hence no distributor switch) this closure of switches $D^1$ will complete two separate circuits through switches D and F. If there is more than one issuer present these two circuits will be closed when the distributor arm H arrives at the distributor contacts for the A issuer. Completion of the circuit through second switch F and hence through third switch $P^1$ will send an impulse through the first parts (C1) of all the C magnets in file No. 5 of pool group V (the "place" group) and also the GT magnet in that file. Completion of the circuit through first switch D will similarly send an impulse through the second parts (C2) of all the C magnets in rank No. 2 of all the pool groups. Although several of the C magnets will thus have one or other of their two parts energised it is only the required C magnet (marked 25 in the drawing) which will have both its parts energised at the same time and hence that is the only C magnet able to operate its adding unit escapement to add the transaction to the competitor count as five-units transaction in the place pool. The five-units place GT magnet (marked GT5) will similarly cause the transaction to be recorded in the grand total adding unit for the place pool. Ticket issuer B is shown as set to record a ten-units transaction in the win pool in respect of competitor No. 1.

When the adding circuits are closed (through switches D and F) the two parts of the trip magnet (J) are also energised, thus to open the trip switch K and thereby reopen the adding circuits and at the same time close the issuer circuit in known manner, for performance of an ordinary ticket production cycle. This cycle ends by reverting the trip switch K to its closed position and releasing the several selector switch handpieces in readiness for the recording of a next transaction and issue of a ticket thereon.

From the drawing it will be seen that for an installation to provide for four stake values in three pools for twenty competitors the number of wires from the issuers to the magnet array will be only thirty-two as against the number (over three hundred) which would be required if the circuiting arrangements were made in accordance with the practice current heretofore. The number of adding units required will be sixty-three made up of twenty competitor adding units and one grand total adding unit for each of the three pools. The competitor adding units will be fed by two hundred and forty C magnets, comprising four different stake value magnets for each of twenty competitors in each of three different pools. Similarly, the grand total adding units will be fed by twelve GT magnets, comprising four different stake value magnets for each of three different pools. It will be seen from this that if the number of competitors which may be dealt with by the installation is M, the number of pools N and the number of stakes P, then the number of C magnets is equal to the product M.N.P and the number of GT magnets is equal to the product N.P. It will also be clear that M, N and P may each be any number not less than two.

Although it is stated above that the number of C magnets and the number of GT magnets are both "equal" to certain products, it has to be appreciated that these numbers are in the nature of minimum quantities, because they may be increased where an installation is required to cater for large transaction volumes necessitating a large number (several dozens for example) of ticket issuing machines in a single installation. For example, in the illustrated embodiment of the invention each competitor adding unit is fed by a short rank of C magnets able to actuate four escapements to provide for four stake values. Such a group of C magnets and escapements may be multiplied indefinitely; the motions of the escapements being summed together by epicyclic gear trains or the like as well understood.

There may be several variations in the form of the invention shown by the drawings; for example, the second selector switch is shown as a pool switch and the third switches are stake switches, obviously the second switch could be a stake switch as master to a plurality of pool switches.

Again, the use of a trip switch (such as K) and a trip magnet (such as J) is desirable to ensure completion of the adding circuit, and hence recording of a transaction as an inescapable prerequisite to initiation of the ticket production cycle in respect of that transaction. It will be appreciated, however, that the invention would possess utility as a transaction recorder in the absence of the trip devices and that in that case ticket production could be arranged for manually or by other means not necessarily dependent on energisation of an adding circuit.

The GT magnets instead of consisting of a single magnet or two part magnets joined in series, could each consist of two combinedly effective but individually ineffective parts, in like manner to the C magnets. In such case the first and second GT magnet parts could be connected up in the same manner as the C magnets, with the exception that instead of the second parts being connected to one only of the first selector contacts (as in the case with the C magnets) they would be connected to all of those contacts, or to some point (such as the switch D) which is common to all those contacts.

If desired, the pool and stake selector switches, or their handpieces, may be provided with springs or other loading means which render them self-returning (when unlocked after issue of a ticket) to those pool and stake positions which are most in demand. For example, if the single monetary unit transaction in the win pool is required much more frequently than other transactions, the second and third switches may be loaded automatically to revert to those positions (after having been used and locked in some other position) so that for the majority of transactions only the first selector switch need be operated.

I claim:

1. In a race totalisator of the kind comprising, means for issuing tickets, a plurality of electromagnetically operable competitor adding units, and a plurality of electromagnetically operable grand total adding units, multi-pool multi-stake ticket sales totalizing arrangements comprising, a first selector switch, a set of first selector contacts associated with said first selector switch, a second selector switch, a plurality of second selector contacts associated with said second selector switch, a plurality of third selector switches equal in number and respectively connected to said second selector contacts, a set of third selector contacts of which a plurality are associated with each of said third selector switches, a plurality of competitor adding unit-operating magnets each consisting of two combinedly effective but individually ineffective first and second parts, first conductor means whereby said first and second selector switches are connected to electric supply, second conductor means whereby said competitor magnet first parts are divided into a plurality of first separate circuits each of which is connected to one of said first selector contacts and in each of which circuits the constituent magnet first parts are connected in series, third conductor means whereby said competitor magnet second parts are divided into a plurality of second separate circuits each of which is connected to one of said third selector contacts and in each of which circuits the constituent magnet second parts are connected in series, said second circuits being composed of magnet second parts each respectively associated with one of said first parts in one of said first circuits, and a grand total adding unit operating magnet serially connected in each of said second circuits so that upon circuit closure through all three of said selector switches only one of said grand total magnets is energized and only one of said competitor magnets has both of its parts energized.

2. Multi-pool multi-stake ticket sales totalizing arrangements according to claim 1 wherein said first conductor means incorporate a trip switch and a trip magnet consisting of two combinedly effective but individually ineffective parts.

3. Multi-pool multi-stake ticket sales totalizing arrangements according to claim 1 which incorporate a plurality of ticket issuing machines and a rotary distributor switch whereby only one of said machines is effective at any one time.

AWDRY FRANCIS JULIUS.

REFERENCES CITED

The following references are of record in the file of this patent:

UNITED STATES PATENTS

| Number | Name | Date |
|---|---|---|
| 2,479,681 | Handley | Aug. 23, 1949 |

FOREIGN PATENTS

| Number | Country | Date |
|---|---|---|
| 362,654 | Great Britain | Dec. 10, 1931 |